United States Patent Office 2,917,472
Patented Dec. 15, 1959

2,917,472
MANUFACTURE OF POLYVINYL CHLORIDE COMPOSITIONS

Walter Fairbairn Smith, Manchester, England, assignor to Imperial Chemical Industries Limited, London, England, a corporation of Great Britain No Drawing. Application January 6, 1956
Serial No. 557,637

Claims priority, application Great Britain
January 10, 1955

4 Claims. (Cl. 260—2.5)

This invention relates to improvements in or relating to the manufacture of polyvinyl chloride compositions and especially such compositions containing a blowing agent.

In the prior art compounding processes polyvinyl chloride is mixed with plastizer and other ingredients and then mechanically mixed on, for example, a hot Banbury mixer or a hot two-roll mill until gelling occurs. The gelled material can then be hot calendered onto substrates or formed into shapes. In both the compounding and the calendering or shaping operations elevated temperatures are required, of the order of 140–170° C. for some purposes, and especially when blowing agents are to be incorporated in the compound, the use of elevated temperatures is undesirable, since otherwise premature blowing or other disadvantages occur. It is an object of the present invention to provide a compounding process that avoids, at least in part, the use of high temperatures.

According to the present invention there is provided a process for the manufacture of polyvinyl chloride compositions which comprises first mixing together a portion of the polyvinyl chloride and substantially all of the plasticizer and gelling this mixture, preferably with mechanical working, at an elevated temperature and then adding to the so-formed gel the remainder of the polyvinyl chloride and mixing without the use of elevated temperature.

The first stage of the p;rocess is performed at the elevated temperatures customarily employed in the compounding of polyvinyl chloride, from about 120° C. to about 160° C., using for example a hot Banbury mixer or a hot two-roll mill. The proportions of the ingredients required to give technically useful products that can be satisfactorily used in the second stage of the process are from 20 to 30 parts by weight of polyvinyl chloride to 80 parts by weight of plasticizer. The gelled material is of the consistency of milled crepe rubber.

In the second stage of the process the remainder of the polyvinyl chloride is mixed with the gelled material at normal atmospheric temperatures or slightly higher if desired; it is found that temperatures of 20° C. to 45° C. are suitable. The mixing may be performed, for example, on a cold Banbury mixer or a cold two-roll. The amount of polyvinyl chloride added during the second stage is such that the final composition contains from 40 to 150 parts by weight of plasticizer to 100 parts by weight of polyvinyl chloride.

The polyvinyl chloride composition so obtained is of the consistency of a partially gelled polyvinyl chloride spreading paste. It can be calendered onto substrates or shaped at normal atmospheric temperatures of about 20° C. to 50° C. and then fused by heating to about 150° C. to 200° C. for a few minutes.

Other polyvinyl chloride compounding ingredients may be added at any convenient stage of the process. Thus, for example, calcium stearate or other stabilizers may be added during the first stage in order to prevent decomposition and gelling of the polyvinyl chloride during heating. Fillers such as china clay and pigments may be added during the second stage. In particular blowing agents may be added during the second stage and this forms a preferred feature of the invention for thereby premature decomposition of the blowing agent is avoided. Suitable blowing agents include polynitrosamines, as in British specification 587,023 and $\alpha:\alpha'$-azo-diisobutyronitrile and dinitrosodimethyl terephthalimide. The blowing agent is conveniently added to the composition in the form of a dispersion in a plasticizer since thereby a uniform cellular structure of small pore size may be attained in the product. This is of particular importance when the composition is to be calendered onto a fabric to give a thin coating. When the blowing agent used is a polynitrosamine it is advantageous to add also, conveniently in the form of a dispersion in a plasticizer, an agent to assist in the complete decomposition of the blowing agent, for example salicylic acid or other acidic substance such as phthalic anhydride.

The invention is illustrated but not limited by the following examples in which parts and percentages are by weight.

Example 1

80 parts of dioctylphthalate, 25 parts of polyvinyl chloride and 4 parts of calcium stearate are mixed together and the composition is gelled by running it in a Banbury mixer heated to 120° C. The gelled material is cooled and removed from the mixer. At this stage its consistency resembles that of milled crepe rubber.

The following ingredients are then added to this gelled material, on a cold two-roll mill or in a cold Banbury mixer.

| | Parts |
|---|---|
| Polyvinyl chloride | 75 |
| Turkey red oxide | 6 |
| 20% dispersion of di-N-nitrosopentamethylenetetramine in tricresyl phosphate | 3.8 |
| 25% dispersion of salicylic acid in tricresyl phosphate | 3.8 |

The final mix so obtained can be calendered at normal atmospheric temperature (20–30° C.) on to fabric and then fused at 170–180° C. for 5–10 minutes to give a cellular blown coating with a thickness of 0.63 mm. (thickness of coating before fusing 0.30 mm.).

Example 2

70 parts of a lauric acid modified polypropylene adipate plasticizer (mol. wt. approx. 1500) and 21 parts of polyvinyl chloride and 4 parts of calcium stearate are mixed together and gelled in a Banbury mixer heated to about 130° C. After gelling, the mixer is cooled and the gelled material is removed. At this stage it has a consistency of milled crepe rubber.

The following ingredients are then added to this gelled material on a cold two-roll mill or in a cold Banbury mixer.

| | Parts |
|---|---|
| Polyvinyl chloride | 79 |
| Turkey red oxide | 6 |
| 25% dispersion of salicylic acid in tricresyl phosmine in tricresyl phosphate | 5.7 |
| 25% dispersion of salicyclic acid in tricresyl phosphate | 5.7 |

The final mix so obtained can be calendered at normal atmospheric temperatures on to fabric and then fused at 170–180° C. for 10–15 minutes to give a cellular blown coating with a thickness of 1.05 mms. (thickness of coating before fusing was 0.4 mm.).

What I claim is:

1. Process for the manufacture of polyvinyl chloride compositions which comprises first mixing together from 20 to 30 parts by weight of polyvinyl chloride with 80 parts by weight of plasticizer and gelling this mixture at a temperature between about 120 and 160° C., then in a second stage adding to the so-formed gel an amount of polyvinyl chloride such that the final composition contains from 40 to 150 parts by weight of plasticizer to 100 parts by weight of polyvinyl chloride, and mixing at a temperature between about 20–50° C.

2. Process for the manufacture of polyvinyl chloride compositions as claimed in claim 1 wherein a blowing agent is incorporated during the second stage, said blowing agent being selected from the group consisting of aliphatic polynitrosamine blowing agents, $\alpha:\alpha'$-azo-di-isobutyronitrile and dinitrosodimethyl terephthalimide.

3. Process for the manufacture of polyvinyl chloride compositions as claimed in claim 2 wherein the blowing agent is added to the composition in the form of a dispersion in a plasticizer.

4. In the preparation of polyvinyl chloride compositions wherein the polyvinyl chloride is mixed with a plasticizer and the resulting mixture is mechanically worked until gelling occurs after which the gelled material is calendered, the improvements which comprise first mixing a portion of the polyvinyl chloride and all of the plasticizer in proportions such that the mixture contains from 20 to 30 parts by weight of polyvinyl chloride to 80 parts by weight of plasticizer, gelling the resulting mixture, while mechanically working the same, at a temperature between about 120° C. and about 160° C., whereby a gelled mixture having a consistency of milled crepe rubber is obtained, and thereafter adding the remaining polyvinyl chloride to the gelled mixture and admixing the same, at a temperature between about 20 and 45° C., the amount of polyvinyl chloride added being sufficient to give a final composition containing from 40 to 150 parts by weight of plasticizer to 100 parts by weight of polyvinyl chloride, and subjecting the thus prepared mixture to calendering.

References Cited in the file of this patent

UNITED STATES PATENTS

| | | |
|---|---|---|
| 2,327,128 | Renfrew et al. | Aug. 17, 1943 |
| 2,386,995 | Wigal | Oct. 16, 1945 |
| 2,754,276 | Walker et al. | July 10, 1956 |

OTHER REFERENCES

Parker et al.: "Modern Plastics," volume 30, No. 6, February 1953, pages 129, 130, 132, 134, 218.